June 3, 1941.  P. M. THORN ET AL  2,243,990
ELECTRIC OUTLET CONDUIT
Filed Aug. 6, 1938  2 Sheets-Sheet 1
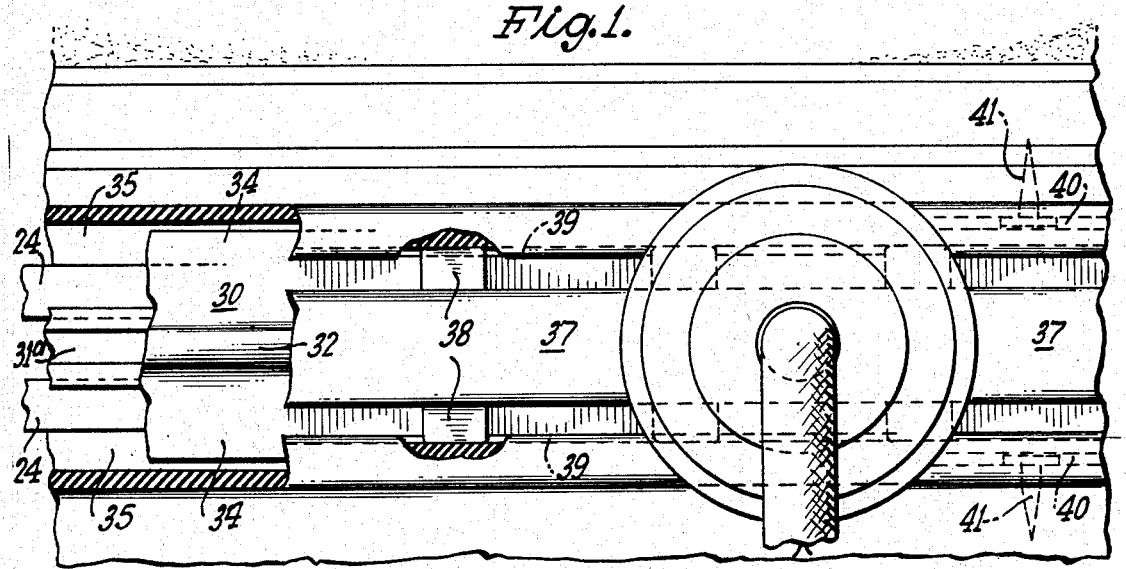
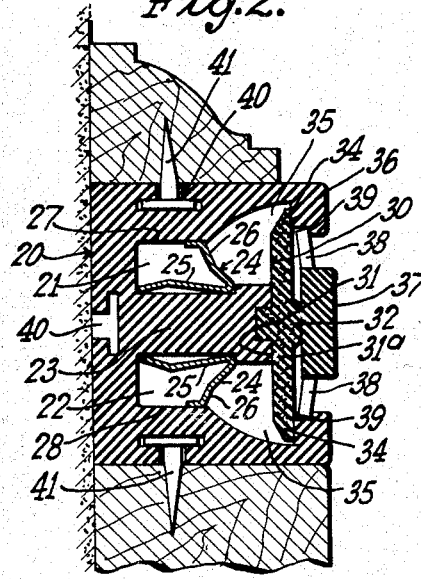
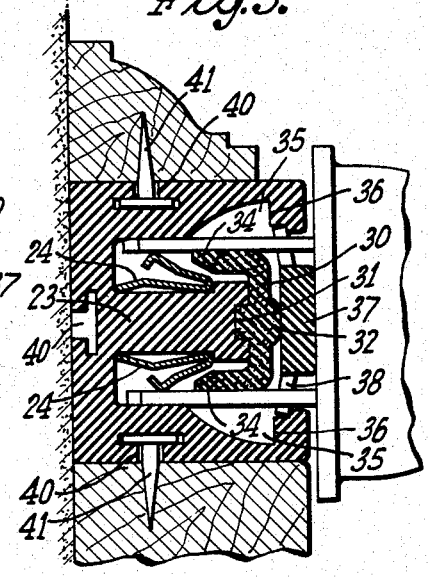
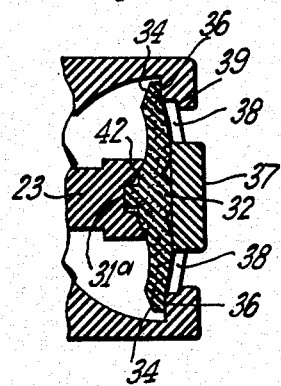
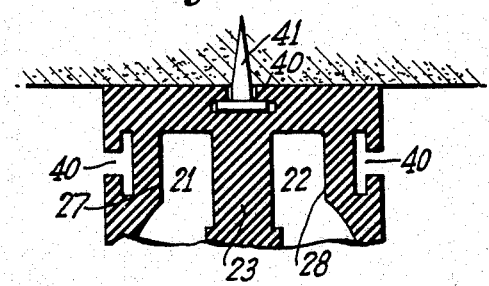
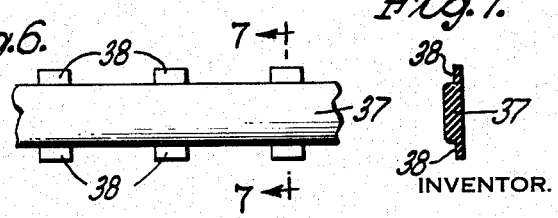
INVENTOR.
PERCY M. THORN
ALEXANDER PARLINI
HEINZ RECKER
BY Willis B. Rice
ATTORNEY June 3, 1941.  P. M. THORN ET AL  2,243,990
ELECTRIC OUTLET CONDUIT
Filed Aug. 6, 1938  2 Sheets-Sheet 2
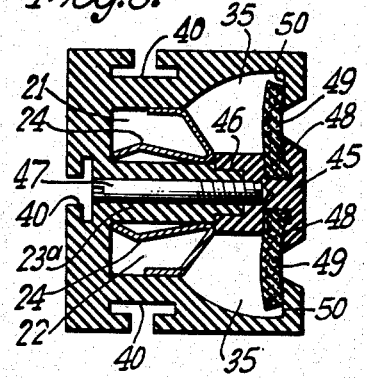
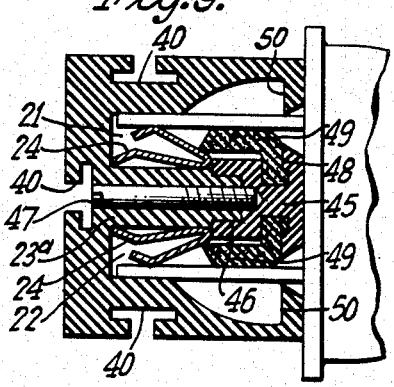
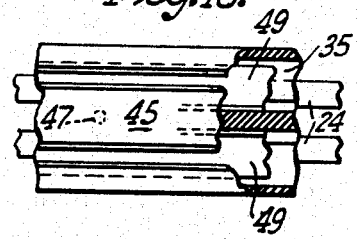
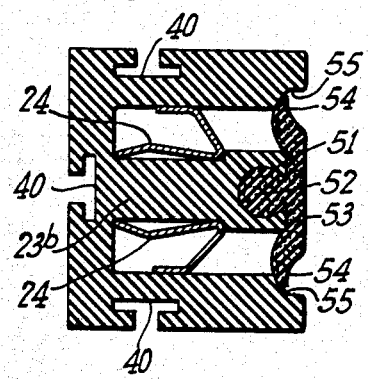
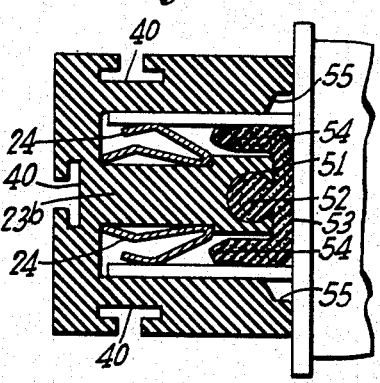
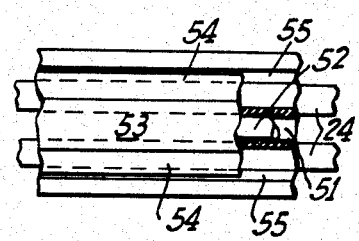
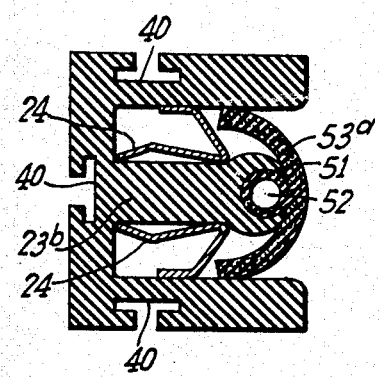
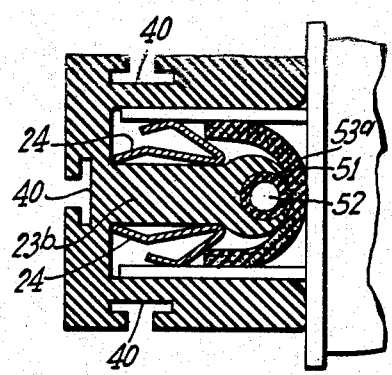
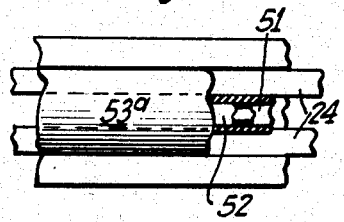
INVENTOR.
PERCY M. THORN
ALEXANDER PARLINI
HEINZ RECKER
BY
Willis B. Rice
ATTORNEY Patented June 3, 1941

2,243,990

UNITED STATES PATENT OFFICE 2,243,990

ELECTRIC OUTLET CONDUIT

Percy M. Thorn, New Rochelle, and Alexander Parlini, Woodside, Long Island, N. Y., and Heinz Recker, Ridgewood, N. J.; said Parlini and Recker assignors to said Thorn Application August 6, 1938, Serial No. 223,446

5 Claims. (Cl. 173—334.1)

This invention relates to electric outlet conduits.

It is an object of this invention to provide a new and improved outlet conduit in which a standard outlet plug may be inserted at any point desired throughout the length of the conduit and which will afford a firm electric contact at every point and which at the same time will insure that the conduit itself will be closed at all times except at the point where the plug has been inserted and will thus be free from liability of the entrance of dirt or water.

It is a further object to provide a device of the character described which will be practical and inexpensive to manufacture and which, nevertheless, will be efficient and attractive in appearance.

The invention accordingly comprises an article of manufacture possessing the features, properties, and the relation of elements which will be exemplified in the article hereinafter described and the scope of the application of which will be indicated in the claims.

For a fuller undertsanding of the nature and objects of the invention, reference should be had to the following detailed description, taken in connection with the accompanying drawings, in which:

Figure 1 is a side elevation of a conduit embodying this invention.

Figure 2 is a cross section of the same.

Figure 3 is a cross section similar to Figure 2 but with the prongs of the outlet plug in place.

Figure 4 is a fragmentary cross section showing a slightly modified form of a portion of the device.

Figure 5 is a fragmentary view showing the manner of applying the conduit to the ceiling or side wall.

Figure 6 is a plan view of the closing strip used in the construction of Figure 2.

Figure 7 is a section on the line 7—7 of Figure 6.

Figures 8 and 9 are cross sections of a modified form of the device without and with the prongs of the plug in place.

Figure 10 is a front elevation of the same construction.

Figures 11 and 12 are cross sections of another modification without and with the prongs of the plug in place.

Figure 13 is a front elevation of the construction of Figures 11 and 12.

Figures 14 and 15 are cross sections of another modification without and with the prongs of the plug in place.

Figure 16 is a front elevation of the construction shown in Figures 14 and 15.

The device of this invention comprises primarily a longitudinal insulating strip 20 having a pair of channels 21 and 22 cut therein separated by a longitudinal dividing wall 23. Within each of these channels there is provided a continuous strip 24 of conducting material having a general cross section of a figure 7 and as illustrated, the stem 25 of the figure 7 is against the central dividing wall 23 and the other end 26 or cross bar of the figure 7 presses outwardly against the outer wall 27 or 28 of the channel. We prefer to place the stems toward the dividing wall in order to utilize this space between the prongs of the attachment plug to the best advantage and with this construction it is possible to make the distance between the outer walls 27 and 28 equal to the outside distance between the prongs of the plug.

The angularity of the cross bar 26 of the conducting strip 24 is so chosen that when the prongs are inserted in place the stem will have a distinct angularity to the prongs so that the attempt to pull out the prongs increases the pressure of the conducting strip against the prongs. Moreover, by reason of the fact that the conducting strip is continuous the insertion of the prongs does not give a permanent set to the metal of the conducting strip but instead the bending pressure is distributed throughout a considerable portion of the length of the conducting strip so that there is no danger of giving a permanent set to the metal of the conducting strip by the insertion of the prongs. Means are provided for closing the outer end of the channels comprising a flat strip of rubber 30 having a central rib 31 fitting within a channel 31a in the end of the dividing wall 23 and a second bead 32 on the opposite face of the strip. The lateral edges 34 of this rubber strip extend within a cutout portion 35 of the channels 21 and 22 and fit against an inside shoulder 36 carried by the end walls in such a manner as tightly to close the channels.

A longitudinal bar 37 of a width less than the distance between the prongs of the attachment plug is used to hold the rubber strip 30 in place and this bar 37 is held in place by arms 38 which extend outwardly from it at spaced intervals in position to engage beneath shoulders 39 upon the outer ends of the outside walls of the channel.

With this construction the device may be easily assembled. The strip 24 is readily inserted in place in the channel before the rubber strip is put in place. The rubber strip because of its own resiliency is easily inserted and then the bar 37 may be put in place springing the outer walls of the channels just sufficient to catch the arms 38 beneath the shoulders 39.

With this construction it will be clear that the plug may be inserted at any point along the conduit excepting, of course, immediately opposite the arms 38 and at any point will make a good contact with the conducting strip.

When the plug is inserted the rubber covering is pushed out of the way as shown in Figure 3 only far enough to permit the prongs to be inserted and at all other parts of the length of the conduit the channels remain closed.

The prongs of the attachment plug are firmly held in place because of the angularity of the strips 24 as well as by the friction of the rubber strip 30 bearing against the side faces of the prongs. As soon, however, as the prong is partially removed to the point where the end of the prong commences to pass the point of contact with the cross member 26, the resiliency of the cross member, which is of course of spring material, will immediately force the prongs outwardly making it impossible for the prongs to be left in a position within arcing distance of the conducting strip, that is if the prongs start to leave the strip contact will be completely broken without danger of arc.

Means are provided whereby this conduit may be readily attached to surrounding building structures comprising a plurality of T shaped slots 40 of such size and dimension as snugly to receive the points of standard carpet tacks 41 and thereafter the tacks may be readily forced into the wood by merely pressing against the conduit thus firmly holding the conduit in place.

Figure 2 shows the conduit thus held between two sections of molding and Figure 5 shows the same conduit held flat against an open wall, as for example a side wall or ceiling.

In the construction of Figure 4 the outer face of the dividing wall 23 is concaved inwardly toward the channel 31a as shown at 42 and the strip 37 bears with sufficient pressure against the bead 32 to cause the free ends 34 to exert some pressure against the shoulder 39 to assist in making a tight closure.

In the construction shown in Figure 8 there is provided upon the outer end of the dividing wall 23a a block 45 dovetailed to the dividing wall as shown at 46 and held in place by any convenient means, as for example by cementing or, as illustrated, by means of a screw 47. This block 45 has a pair of oppositely disposed slots 48 each carrying a resilient strip, as for example of rubber, 49 in a position to bear against the inner shoulder 50 to effect a tight closure of the device.

This device can readily be assembled by opening or closing the dovetailed connection 46, as for example by removing the screws 47.

In the form of the invention disclosed in Figures 11 and 12 the outer end of the dividing wall 23b is provided with a circular recess 51 into which is fitted a circular bead 52 of a rubber strip 53 having lateral edges 54 fitting within a rabbet 55 in the outer walls of the channels. The edges 54 being of such length as to overlap the edges of the rabbet and maintain the channels closed but being of sufficient resilience as to spring inwardly, as shown in Figure 12, in response to the insertion of the prongs. When the prongs are removed the edges of the strip 53 are carried outwardly beyond the rabbet to fall back to their original place when free from the prongs.

The construction shown in Figures 14, 15 and 16 is similar to that of Figures 11, 12 and 13, except that the rubber strip 53a is normally bent inwardly within the channels and is of such length that it is not pulled out of the channel even when the prongs are removed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. An electric outlet conduit having in combination a longitudinal insulating strip having two parallel channels therein separated by a dividing wall and spaced a distance sufficient to receive the prongs of a plug, a longitudinal conducting strip in each of said channels each having in cross section two divergent arms held in compression by the side walls of the channel, a rubber strip upon the outer end of said dividing wall and having its lateral edges so disposed as to close said channels in which the rubber strip is provided with a central longitudinal bead and the outer end of the dividing wall is provided with a longitudinal recess to receive said bead.

2. An electric outlet conduit having in combination a longitudinal insulating strip having two parallel channels therein separated by a dividing wall and spaced a distance sufficient to receive the prongs of a plug, a longitudinal conducting strip in each of said channels each having in cross section two divergent arms held in compression by the side walls of the channel, a rubber strip upon the outer end of said dividing wall and having its lateral edges so disposed as to close said channels in which the rubber strip is provided with a central longitudinal bead and the outer end of the dividing wall is provided with a longitudinal recess to receive said bead, and having its lateral edges confined by the walls of said channel.

3. An electric outlet conduit comprising in combination a longitudinal insulating strip having two parallel longitudinal channels therein separated by a dividing wall and spaced a distance apart sufficient to receive the prongs of a plug, a longitudinal spring conducting clip in each of said channels in position to contact said prongs, a rubber strip attached to the outer face of said dividing wall, the outer face of said channels being undercut to provide an interior shoulder and the rubber strip being of such length and so disposed as to lie against said shoulder to close said channel.

4. A device in accordance with claim 3 having a longitudinal block extending lengthwise of said conduit bearing against said rubber strip and having spaced arms extending outwardly to engage the outer face of said channels to hold said strip in place.

5. A device in accordance with claim 3 having a longitudinal block extending lengthwise of said conduit, said outer face of said channels being undercut to provide a second shoulder and said longitudinal block bearing against said rubber strip and having spaced arms extending outwardly to engage said second undercut portion of said longitudinal strip to hold said rubber strip in place.

PERCY M. THORN.
ALEXANDER PARLINI.
HEINZ RECKER.